(12) United States Patent
Kalafut (10) Patent No.: US 11,393,666 B2
(45) Date of Patent: Jul. 19, 2022

(54) AUTOMATIC MS-N CHARACTERIZATION OF MASS SPECTROMETRIC "DARK MATTER"

(71) Applicant: Thermo Finnigan LLC, San Jose, CA (US)

(72) Inventor: Bennett S. Kalafut, San Jose, CA (US)

(73) Assignee: THERMO FINNIGAN LLC, San Jose, CA (US)

(*) Notice: Subject to any disclaimer, the term of this patent is extended or adjusted under 35 U.S.C. 154(b) by 206 days.

(21) Appl. No.: 16/721,118

(22) Filed: Dec. 19, 2019

(65) Prior Publication Data

US 2021/0193446 A1 Jun. 24, 2021

(51) Int. Cl.
*H01J 49/00* (2006.01)
*G01N 30/02* (2006.01)
(Continued)

(52) U.S. Cl.
CPC ............ *H01J 49/004* (2013.01); *G01N 30/02* (2013.01); *G01N 30/72* (2013.01);
(Continued)

(58) Field of Classification Search
CPC .... H01J 49/004; H01J 49/165; H01J 49/0027; H01J 49/009; H01J 49/26; G01N 30/02;
(Continued)

(56) References Cited

U.S. PATENT DOCUMENTS 6,940,065 B2  9/2005  Graber et al.
7,070,949 B2  7/2006  Suckau et al.
(Continued)

FOREIGN PATENT DOCUMENTS

CN   110672746 A   1/2020

OTHER PUBLICATIONS

Peisl et al., "Dark matter in host-microbiome metabolomics: Tackling the unknowns—A review", Analytica Chimica Acta 1037 (2018), pp. 13-27.
(Continued)

*Primary Examiner* — Kiet T Nguyen
(74) *Attorney, Agent, or Firm* — Thomas F. Cooney (57) ABSTRACT

A system comprises: first and second mass spectrometers; at least one liquid chromatograph configured to simultaneously supply a first stream of chromatographic eluate derived from a sample to the first mass spectrometer and a second stream of chromatographic eluate to the second mass spectrometer; and a computer or electronic controller electronically coupled to both of the first and second mass spectrometers and comprising computer-readable instructions operable to: input a mass spectrometric analysis of a chromatographic fraction of the sample obtained by the first mass spectrometer; determine whether an additional mass spectrometric analysis of the chromatographic fraction of the sample is required, based on the mass spectrometric analysis of the chromatographic fraction obtained by the first mass spectrometer; and, if the determination is affirmative, cause the second mass spectrometer to perform, after a time delay, the additional mass spectrometric analysis of the chromatographic fraction of the sample.

17 Claims, 6 Drawing Sheets

(51) Int. Cl.
*G01N 30/72* (2006.01)
*H01J 49/26* (2006.01)
*G01N 30/78* (2006.01)
*H01J 49/16* (2006.01)

(52) U.S. Cl.
CPC ......... *G01N 30/7233* (2013.01); *G01N 30/78* (2013.01); *H01J 49/009* (2013.01); *H01J 49/0027* (2013.01); *H01J 49/26* (2013.01); *G01N 2030/027* (2013.01); *H01J 49/165* (2013.01)

(58) Field of Classification Search
CPC .... G01N 30/7233; G01N 30/78; G01N 30/72; G01N 2030/027
USPC ......................................... 250/288, 281, 282
See application file for complete search history.

(56) References Cited

U.S. PATENT DOCUMENTS

| | | |
|---|---|---|
| 7,485,853 B2 | 2/2009 | Bebetamann et al. |
| 7,797,988 B2 | 9/2010 | Schultz et al. |
| 9,911,585 B1 | 3/2018 | Zabrouskov |
| 9,976,995 B2 | 5/2018 | Brown et al. |
| 10,203,309 B2 | 2/2019 | Taneda |
| 2006/0289737 A1* | 12/2006 | Bassmann .......... G01N 30/7233 250/282 |
| 2009/0189073 A1* | 7/2009 | Yamaguchi .......... H01J 49/009 250/288 |

OTHER PUBLICATIONS

Plumb et al., "UPLC/MSE; a new approach for generating molecular fragment information for biomarker structure elucidation", Rapid Commun. Mass Spectrom. 2006, 20, pp. 1989-1994.
Spalding et al., "Bar Coding MS2 Spectra for Metabolite Identification", Anal. Chem. 2016, 88, pp. 2538-2542.
Byrdwell, "Dual Parallel Liquid Chromatography/Dual Mass Spectrometry (LC2/MS2) of Bovine Brain Total Lipid Extract", Journal of Chromatography & Related Technologies, 2003, vol. 26 (19), pp. 3147-3181.
Byrdwell, "Multiple Parallel Mass Spectrometry for Liquid Chromatography", Handbook of Advanced Chromatography/Mass Spectrometry Techniques, Chapter 10, 2017, pp. 365-405.
Wu, "Role of liquid chromatography—high-resolution mass spectrometry (LC-HR/MS) in clinical toxicology", Clinical Toxicology (2012), 50, pp. 733-742.

* cited by examiner

AUTOMATIC MS-N CHARACTERIZATION OF MASS SPECTROMETRIC "DARK MATTER"

FIELD OF THE INVENTION

The present invention relates to mass spectrometry and mass spectrometers. More particularly, the present invention relates to mass spectrometric data-independent analyses of complex biological samples.

BACKGROUND OF THE INVENTION

Mass spectrometry has become the method of choice for fast and efficient identification of proteins, peptides, metabolites and other molecules in biological samples. In particular, tandem mass spectrometry of analyte molecules derived from a complex mixture can be used to identify and quantify the analyte compounds present in the original mixture. In general practice, such information is obtained by ideally selecting and isolating single ion species (of a single mass-to-charge ratio, or m/z, value or of a restricted range of m/z values) and subjecting such so-isolated precursor ions to fragmentation so as to yield product ions that can be used to identify peptides. Ion fragmentation can be provided by various methodologies and mechanisms including collision-induced dissociation (CID), infrared multiphoton dissociation (IRMPD). Other fragmentation methodologies include Electron Capture Dissociation (ECD) and Electron Transfer Dissociation (ETD).

Figure 1:
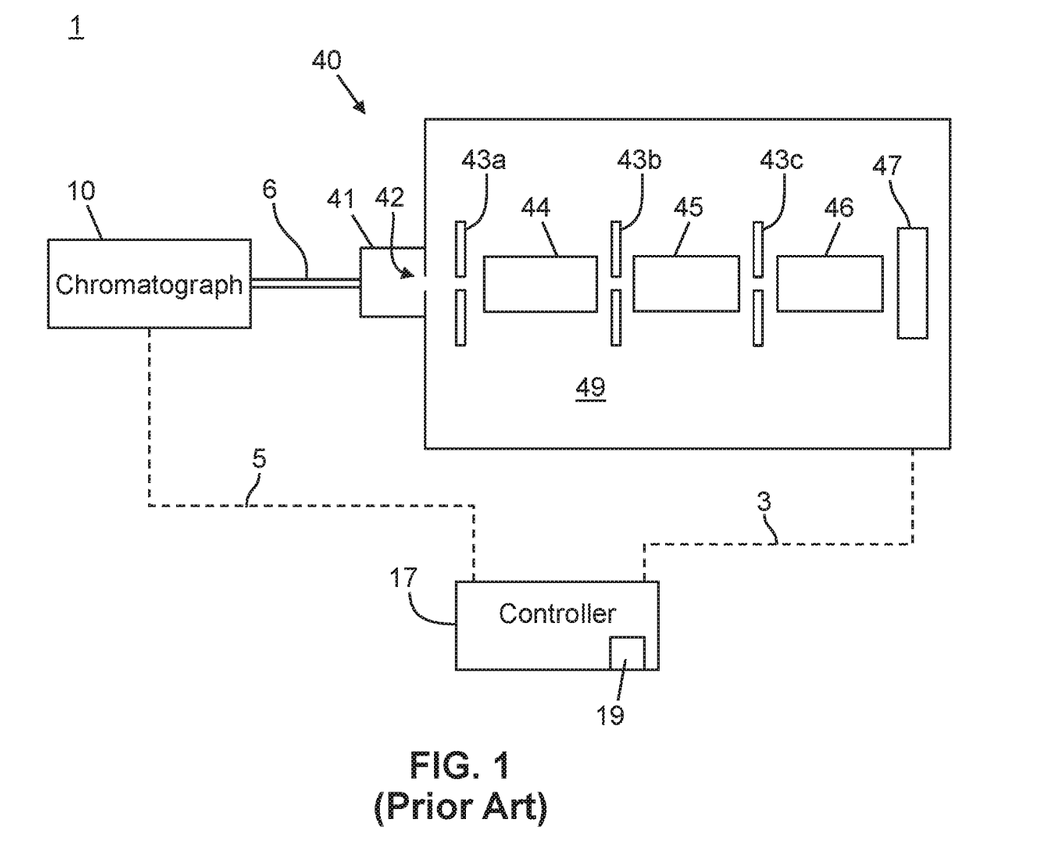
FIG. 1 is a schematic illustration of a coupled chromatograph and mass spectrometer system as may be employed in conjunction with methods and systems of the present teachings.

FIG. 1 illustrates a generalized schematic depiction of an analysis system 1 comprising a liquid chromatograph and mass spectrometer (e.g., an LCMS system) as may be employed to generate tandem mass spectra corresponding to mass spectral experiments of the type discussed in this document. In the system 1, a liquid chromatograph 10 provides a stream of liquid eluate to an ion source 41 of the mass spectrometer 40 through a fluidic conduit 6. The ion source which may, without limitation, comprise an electrospray, thermospray or Atmospheric Pressure Chemical Ionization (APCI) source generates a plume of ions of various species which are introduced into a set of evacuated chambers 49 of the mass spectrometer through an inlet aperture or tube 42 thereof.

A set of ion optical components 43a of the mass spectrometer of the analysis system 1 directs the ions into an ion selection, mass analysis or storage device 44 which may comprise, without limitation, a quadrupole mass filter, a quadrupole ion trap or a quadrupole mass analyzer. In some modes of operation, the device 44 may be operated so as to isolate a selected population of ion species, in accordance with a selected m/z value or range of m/z values. In other modes of operation, the device 44 may be operated so as to generate a mass spectrum or mass spectra of the ions that are introduced into the evacuated chamber. A second set of ion optical components 43b directs ions from the device 44 into a fragmentation cell 45. The fragmentation cell may operate according any one of several mechanisms including, without limitation, collision-induced dissociation (CID), infrared multiphoton dissociation (IRMPD), Electron Capture Dissociation (ECD) and Electron Transfer Dissociation (ETD).

Fragment ions (i.e., product ions) generated within the fragmentation cell 45 are directed, by means of a third set of ion optical components 43c, to a mass analyzer 46 that includes an ion detector 47. The mass analyze 46 may be any one of various different mass analyzer types and may comprise, without limitation, a quadrupole mass filter, a quadrupole ion trap, a time-of-flight (TOF) mass analyzer, a magnetic sector mass analyzer, an electrostatic trapping mass analyzer, such as an orbital trapping mass analyzer or a Cassini trap mass analyzer or a Fourier Transform Ion Cyclotron Resonance (FT-ICR) mass analyzer. Each mass spectrum, which may be of either precursor ion species or product ion species, that is generated by the mass analyzer 46 and detector 47 is a record of relative detected abundances of ions of different m/z values.

The detector 47 of the analysis system 1 (FIG. 1) communicates such mass spectral data to an electronic controller 17, such as a computer, circuit board, or set of modular integrated circuit components, over an electronic communication line 3. Another electronic communication line 5 may electronically couple the controller 17 to the chromatograph 10. The electronic communication line 3 (or separate communication lines) are used to send control signals from the electronic controller 17 the ion source 41, the ion selection, mass analysis or storage device 44, the fragmentation cell 45, the mass analyzer 46 or the various ion optical assemblies (43a-43c). The electronic communication lines 3, 5, which may be either unidirectional or bi-directional, may be employed to send operational instructions from the controller to any of these various components (as well as others) or to receive information from any of these components (as well as others). The controller 17 includes computer-readable electronic memory 19 and may operate according to control instructions (such as a computer program, either in firmware or software) stored on the electronic memory. The control instructions may comprise instructions to cause the various components of the analysis system 1 to operate in a coordinated fashion so as to execute various mass spectrometry methods as described in this document.

The information that is derived from tandem mass spectrometry experiments comprises a list of m/z values of fragment ions as well as correlations between the fragment-ion m/z values and the m/z values of the precursor ions from which the fragments were derived. This information can be used to search peptide sequence databases to identify the amino acid sequences represented by the spectrum and, thus, to identify the protein or proteins from which the peptides were derived. To identify peptides, database searching programs typically compare each MS/MS spectrum against amino acid sequences in the database, and a probability score is assigned to rank the most likely peptide match.

In a commonly employed method, known as Data-Dependent Analysis or Data-Dependent Acquisition (DDA), that is used to study of proteins and polypeptides, a mass spectrometer repeatedly generates survey mass "scans" of ions generated from a continuous input stream of chromatographically separated biological sample. Because biological samples are complex mixtures, each survey mass spectrum may comprise a large number of peaks resulting from tens or even hundreds of co-eluting different proteins and/or polypeptides, metabolites and other biochemical compounds. In order to distinguish each compound from various others, it is often necessary to perform a tandem mass spectrometry ($MS^2$) experiment in which the ions corresponding to each peak are isolated, the isolated ions (often referred to as precursor ions) are fragmented into smaller and simpler structural units (referred to as fragment ions or product ions) and the set of fragment ions are themselves mass analyzed.

Unfortunately, the number of observed mass spectral peaks in each DDA survey scan is frequently so great that there is insufficient time available, during each elution time window, to analyze all of the various co-eluting compounds in this fashion. Thus, during a DDA experiment, an implicit assumption is made that the most abundant compounds are the most relevant for further characterization by tandem mass spectrometry. Accordingly, the ion species corresponding to the most intense peaks (up to approximately ten in number) in each survey mass spectrum are automatically chosen for MS$^2$ analysis (e.g., Fejes et al. Shotgun proteomic analysis of a chromatophore-enriched preparation from the purple phototrophic bacterium *Rhodopseudomonas palustris*. Photosynth Res. 2003; 78(3):195-203). If data is being obtained from a sample undergoing chromatographic separation, this sequence of events may be repeated as each fraction elutes (i.e., at each of a plurality of chromatographic retention times). Thus, despite their utility and widespread use, data-dependent methods are incapable of generating a fully comprehensive list of all proteins or peptides that may be present in a sample. Such methods only detect the most abundant peptides; numerous other low-abundance peptide compounds that may co-elute together with the abundant peptides remain below a requisite intensity threshold or are indistinguishable from spectral "noise".

Another mass spectral analysis technique known as "data-independent acquisition" has been developed in an attempt expand the number of proteins and peptides that may be detected by LCMS analysis of natural samples. Such expanded coverage could aid an understanding of the complexity of the proteome and the significance of the low-abundance proteome. Such experiments are generally performed without isolation of specific first-generation ion species as precursor ions. Instead, reliance is placed upon computational mining of comprehensive mass spectral data sets obtained from experiments in which first-generation ion species encompassing a wide range of m/z values are simultaneously fragmented so as to generate complex product-ion spectra containing multiplexed signatures of all fragment ions. Although DIA methods can provide a comprehensive list of all possible fragment ions, there is generally no direct recorded "parent-child" relationship between precursor ions and fragment ions. Such details must be discovered by post-experiment computerized data analyses that make references to databases of mass spectra of known compounds. The DIA methods have been made possible by improvements in mass spectrometer speed, accuracy and resolution (thereby limiting interferences between a multitude of mass spectral lines) as well as by the development of mass spectral libraries and advanced computational processing techniques.

Figure 2:
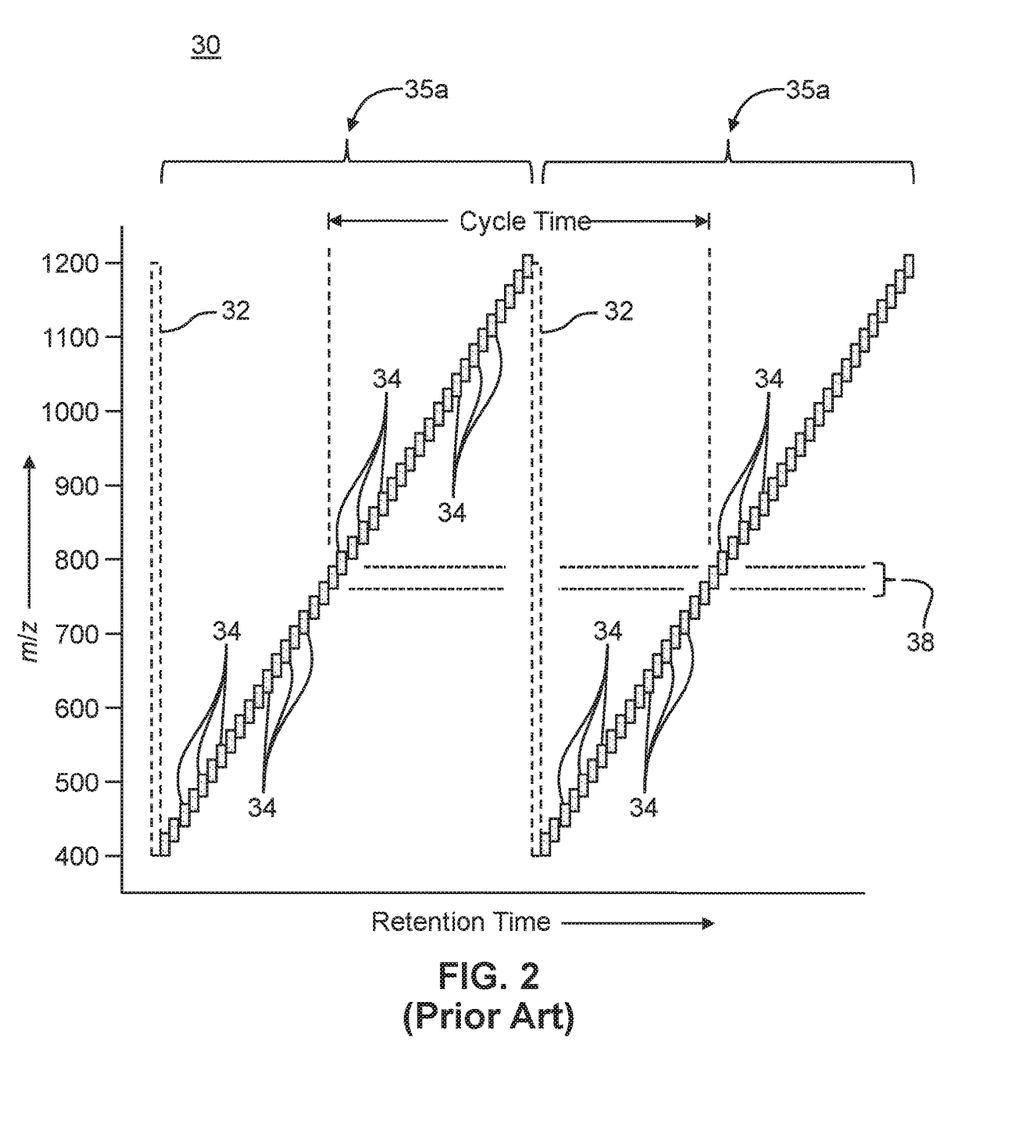
FIG. 2 is a schematic illustration of the sequencing and the m/z ranges of a hypothetical series of fragment-ion mass spectra and optional survey mass spectra as may be obtained during a known data-independent mass spectral analysis of chromatographically eluting analytes.

FIG. 2 is a highly schematic diagram, shown generally at 30, illustrating the general sequence of events that may occur during a hypothetical LCMS analysis performed according to one data-independent acquisition method known as "SWATH MS" (Gillet et al., Targeted Data Extraction of the MS/MS Spectra Generated by Data-independent Acquisition: A New Concept for Consistent and Accurate Proteome Analysis, Mol. Cell. Proteomics, 2012, 11(6)) that is often used in conjunction with SWATH™ quantitative proteomics software. The SWATH MS data-independent procedure includes consecutively acquiring a series of high-resolution, accurate-mass fragment-ion spectra during an entire chromatographic elution (retention time) range by repeatedly stepping through a number (for example thirty two) discrete precursor-ion isolation windows of a certain width (for example, 25 Da width) across a full mass spectral range of interest (for example, the 400-1200 m/z range). FIG. 2 is a highly schematic graphical representation, shown generally at 30, of the SWATH MS technique, wherein m/z values of precursor ions or first-generation ions are represented as ordinate values and chromatographic retention time values are represented as abscissa values. A main feature of the technique, as illustrated in FIG. 2, is a plurality of series of consecutive product-ion analyses 34. Each such product ion analysis 34 is represented as a shaded box and includes the steps of: isolation of precursor ions within a restricted range of m/z values, fragmentation of the isolated precursor ions so as to generate fragment ions and mass analysis of the fragment ions generated from the isolated precursor ions (i.e., a fragmentation scan). Each restricted range of precursor m/z values may be termed an "isolation window" (or, equivalently, an "isolation range" or an "isolated range") and is represented by the range of ordinate values that is spanned by a respective one of the boxes 34. For example, the isolation ranges represented by the first several boxes 34, beginning at the lower left position, of FIG. 2 are 400-430 Da, 420-450 Da, 440-470 Da, 460-490 Da, 480-510 Da, etc. The width of the isolation windows (height of the boxes 34) is significantly greater than those of isolation windows employed in standard shotgun and targeted DDA methods and are represented, in FIG. 2, by the height of the shaded boxes that represent the product ion analyses. It should be noted that the product ions, themselves, that are generated by fragmentation of set of precursor ions may comprise a different range of product-ion m/z values (not specifically indicated by any box).

Two series, 35a and 35b, of product-ion analyses are illustrated in FIG. 2. Consecutive isolation windows (corresponding to consecutive product-ion analyses) partially overlap one another in m/z to assure that there are no m/z gaps within which m/z positions of unfragmented first-generation ions occur. Once the series of isolation windows has covered the full m/z range of interest (i.e., once an end of the full m/z range of interest has been reached), then a new series of consecutive product-ion analyses is investigated in similar fashion starting at the opposite end of the range. The boxes 32 outlined with dashed lines at the beginning of each cycle depict optional acquisition of a high-resolution, accurate mass survey scan of precursor ions throughout the full m/z range of interest. The totality of data product-ion analyses 34 corresponding to any given precursor mass range across the range of retention times is oftentimes referred to as a "swath". One such swath is shown at 38 in FIG. 2.

Another DIA strategy that has been recently described is known as "MS$^2$ barcoding" (Spalding, Jonathan L., Kevin Cho, Nathaniel G. Mahieu, Igor Nikolskiy, Elizabeth M. Llufrio, Stephen L. Johnson, and Gary J. Patti. "Bar coding MS2 spectra for metabolite identification." *Analytical chemistry* 88, no. 5 (2016): 2538-2542). According to this strategy, fragment-ion spectra are not measured with accurate-mass resolution. Instead, the m/z values of product-ion mass spectra are reduced to a set of twenty broad bins, with varying bin widths in the range of approximately 4-10 Th. The positions and widths of the various bins are chosen in advance so as to yield the most informative fragmentation patterns. For each precursor-ion of interest, the corresponding fragment-ion data is collected within each of the bins using a quadrupole mass filter, the bandpass of which is set at the respective bin width. Each observed precursor fragmentation pattern is translated into a binary code by assigning the value "1" to each bin that contains fragments at an above-threshold intensity and assigning the value "0" to bins that do not contain fragments with the requisite intensity. Every mass peak in the precursor-ion spectrum is assigned a respective binary code that is formulated in this fashion, based on this simplified product-ion spectrum. Any of several possible acquisition schemes are used to collect these "MS2 barcodes" efficiently for every precursor mass over the entire duration of an LCMS experiment. During the data analysis step, the combination of the barcode and precursor mass are used to identify the molecule out of a library of barcode-mass pairs computed using a known mass spectrometric library such as METLIN or HMDB. The developers of the $MS^2$ barcoding technique claim that it enables untargeted DIA analysis to be achieved (at least for the field of metabolomics) using low-resolution, low-cost triple quadrupole mass spectrometers, such as is depicted in FIG. 1 of the drawings that accompany the present document.

Yet another DIA technique that has been developed for untargeted metabolomics studies is known as $MS^E$ analysis (Plumb, Robert S., Kelly A. Johnson, Paul Rainville, Brian W. Smith, Ian D. Wilson, Jose M. Castro-Perez, and Jeremy K. Nicholson. "UPLC/MSE; a new approach for generating molecular fragment information for biomarker structure elucidation." *Rapid Communications in Mass Spectrometry: An International Journal Devoted to the Rapid Dissemination of Up-to-the-Minute Research in Mass Spectrometry* 20, no. 13 (2006): 1989-1994). Similarly to the above-described SWATH technique, MSE analysis requires mass spectra to be obtained using a high-resolution, accurate-mass system. According to this approach, the mass spectral acquisition repeatedly alternates between data pertaining to ions subjected to low collision energy (essentially, precursor-ion spectra, also known as $MS^1$ spectra) and data pertaining to fragment ions ($MS^2$ spectra) generated by switching a collision cell to high collision energy. During data analysis, products are matched to their precursors by correlating mass defects, retention times or a combination of both. The reconstructed spectra are used for identification from a spectral library or by spectral analysis/annotation.

Although the existing DDA and DIA techniques have been frequently successfully employed, the incompleteness of the relevant databases remains as a significant issue. At the present time, metabolite databases are not comprehensive even for well-studied tissues and organisms, and at the frontiers of research (e.g. metabolome of the microbiome), the number of unknown metabolites (sometimes called "dark matter") seen in an untargeted LCMS experiment can approach 98% (Peisl, Loulou, Emma L. Schymanski, and Paul Wilmes. "Dark matter in host-microbiome metabolomics: Tackling the unknowns—A review." *Analytica chimica acta* 1037 (2018): 13-27). Consequently, the vast majority of compounds that may be encountered in proteomic and metabolomic studies remain unidentifiable. There is therefore a need in the art for automated strategies for characterizing the unknowns—especially abundant unknown compounds in a tissue or cell population of interest. While DIA provides a great deal of coverage and should be retained as a possibility, re-analysis of the data collected using the DIA strategies discussed above does not in itself suffice to identify unknowns. The ultra-low-resolution $MS^2$ barcodes are completely inadequate for structural determination, and reconstructed $MS^2$ spectra at a single collision energy may not contain enough informative fragments due to the choice of collision energy or to a need for $MS^3$ or $MS^N$ to distinguish possible structures.

SUMMARY

In view of the above-noted needs in the art, methods and apparatus are herein described for using DIA data to trigger more informative $MS^2$ or $MS^N$ scans while DIA is underway. Further, methods and apparatus are described for dynamically generating inclusion or exclusion lists for targeted $MS^2$ or $MS^N$ experiments taking place on instruments connected via a data system. According to the present teachings, one or more "additional" LCMS apparatuses or mass spectrometers are in communication with a first LCMS apparatus or mass spectrometer that runs a DIA experiment. The communication connection may be implemented by a shared data system or, alternatively, by a network of the data systems of the different apparatuses or mass spectrometers. Each apparatus (LCMS apparatus or mass spectrometer) other than the first may run the same LC experiment as the first apparatus but with a delay in starting and with a consequent offset in the times that the various chromatographic fractions arrive at a mass spectrometer portion of the apparatus. According to some embodiments, the chromatographic offsets may vary from each apparatus to the next, like the different voices in a musical canon. The delay can be effected by using a plurality of independent injectors, pumps and columns or, alternatively, by splitting the flow of a single eluate among the several apparatuses and delay its arrival at each apparatus using extra lengths of fluid tubing, taking care to not distort the chromatographic peak shapes too much. Data from the DIA experiment are analyzed as quickly as possible by the data system as they are generated by the first apparatus, and the results of the analysis are used to make either inclusion or exclusion lists for $MS^2$ or $MS^N$ experiments on the other apparatuses. These lists are translated into operational commands that are immediately transmitted to the one or more other apparatuses. The transmitted operational commands include designations of retention times and precursor masses that are to be investigated in targeted mass spectral analyses by the one or more additional apparatuses. Each operational command is executed on each other apparatus when the retention time (RT) at that apparatus matches the RT at which the trigger was detected on the first apparatus. Alternatively, the knowns can be identified and sent for exclusion from a DDA experiment. The various LCMS apparatuses or mass spectrometers need not be of the same type. For example, triple quadrupole instruments are uniquely well-suited for so-called barcoding experiments but traps and high-resolution, accurate-mass instruments and hybrid instruments are better suited for structural elucidation.

If there are more than two mass spectrometers in a system, then one or more of the third, fourth, etc. mass spectrometers may be configured to acquire their mass spectra differently than the way mass spectra are acquired by the second mass spectrometer, in order to perform more thorough analyses. As but one example, information from a first mass spectrometer running a DIA method could be used to populate the inclusion lists (i.e., lists of precursor-ion masses derived from a given sample fraction that are to be investigated by $MS^1$, $MS^2$ or $MS^N$) of second and third mass spectrometers that respectively employ electron-transfer dissociation fragmentation and ultraviolet photo-dissociation ion fragmentation. The use of two or more fragmentation methods in this way can provide a greater level of structural information than would otherwise be available using a single fragmentation method.

According to a first aspect of the present teachings, a liquid chromatographic and mass spectrometric analysis system for analyzing a sample comprises: (1) a first and a second mass spectrometer; (2) at least one liquid chromatograph configured to simultaneously supply a first stream of chromatographic eluate derived from the sample to the first mass spectrometer and a second stream of chromatographic eluate derived from the sample to the second mass spectrometer; and (3) a computer or electronic controller electronically coupled to both of the first and second mass spectrometers, the computer or electronic controller comprising computer-readable instructions operable to: (a) input a mass spectrometric analysis of a chromatographic fraction of the sample obtained by the first mass spectrometer; (b) formulate a determination whether an additional mass spectrometric analysis of the chromatographic fraction of the sample is required, based on the mass spectrometric analysis of the chromatographic fraction of the sample obtained by the first mass spectrometer; and (c) if the determination is affirmative, cause the second mass spectrometer to perform, after a time delay, $\Delta t_d$, the additional mass spectrometric analysis of the chromatographic fraction of the sample.

According to some embodiments, the at least one liquid chromatograph comprises a single liquid chromatograph and the system further comprises: (4) a manifold comprising an inlet port fluidically coupled to an outlet of the single liquid chromatograph and a first and a second outlet port; (5) a first fluid tubing line having a length, $L_1$, and fluidically coupled between the first outlet port and an ion source of the first mass spectrometer, the first fluid tubing line transporting the first stream of chromatographic eluate; and (6) a second fluid tubing line having a length, $L_2$, and fluidically coupled between the second outlet port and an ion source of the second mass spectrometer, the second fluid tubing line transporting the second stream of chromatographic eluate, wherein $L_2 > L_1$. Alternatively, a bore of the first fluid tubing line may have an inner diameter $D_1$ and a bore of the second fluid tubing line may have an inner diameter $D_2$ where $D_2 > D_1$. According to some alternative embodiments, the at least one liquid chromatograph comprises a first liquid chromatograph and a second liquid chromatograph, the system further comprises: (4) a first portion of the sample fluidically coupled to an injection port of the first liquid chromatograph; (5) a second portion of the sample fluidically coupled to an injection port of the second liquid chromatograph; (6) a first fluid tubing line fluidically coupled between the first liquid chromatograph and an ion source of the first mass spectrometer, the first fluid tubing line transporting the first stream of chromatographic eluate; and (7) a second fluid tubing line fluidically coupled between the second liquid chromatograph and an ion source of the second mass spectrometer, the second fluid tubing line transporting the second stream of chromatographic eluate, wherein the computer-readable instructions are further operable to cause the first liquid chromatograph to start chromatographic separation of the first portion of the sample at a time, $t_1$, and to cause the second liquid chromatograph to start chromatographic separation of the second portion of the sample at a time, $t_2$, where $(t_2 - t_1) = \Delta t_d$.

According to some embodiments, the computer-readable instructions are further operable to, if the determination is affirmative, cause the second mass spectrometer to perform the additional mass spectrometric analysis on ions either having or derived from precursor ions having either a particular mass-to-charge ratio (m/z) or a particular range of m/z values. According to some embodiments, the computer-readable instructions are further operable to, if the determination is affirmative, add ions of a particular m/z value or a particular range of m/z values to an exclusion list. According to some embodiments, the computer-readable instructions are further operable to, if the determination is not affirmative, remove ions of a particular m/z value or a particular range of m/z values from an exclusion list. According to some embodiments, the computer-readable instructions that are operable to formulate the determination whether an additional mass spectrometric analysis of the chromatographic fraction of the sample is required are operable to formulate an affirmative determination if the mass spectrometric analysis of the chromatographic fraction of the sample obtained by the first mass spectrometer detects an ion having an m/z value that is absent from a mass spectral library.

According to a second aspect of the present teachings, a liquid chromatography mass spectrometry method comprises: (i) performing, with a first mass spectrometer, mass spectrometric analyses of ions generated from chromatographically separated fractions of a sample within a first stream of chromatographic eluate derived from the sample; and (ii) upon detection of a predetermined condition or event relating to mass spectral data acquired by the first mass spectrometer of a fraction having a retention time, τ1, automatically issuing a command to a second mass spectrometer to perform a mass spectrometric analysis of the ion species within the same fraction within a second stream of chromatographic eluate derived from the sample, wherein the fraction is delivered to the second mass spectrometer at a time that is later, by a time delay, $\Delta t d$, than a time at which the fraction is delivered to the first mass spectrometer.

In some embodiments, the method may further comprise, upon detection of the predetermined condition or event, adding an m/z value of an ion species to an exclusion list. In some embodiments, the predetermined condition or event is the detection, during the mass spectrometric analyses performed by the first mass spectrometer, of an ion species within a fraction having a mass-to-charge ratio (m/z) value for which there is no entry in a database and having a corresponding observed intensity that is greater than or equal to a pre-determined threshold intensity. In some embodiments, the mass spectrometric analysis, by the second mass spectrometer, of the ion species within the fraction having the retention time, $t_1$, is performed simultaneously with mass spectrometric analyses, by the first mass spectrometer, of ion species within a second fraction having a later retention time, $t_2$.

According to some embodiments, the delivery of the fraction to the first mass spectrometer and to the second mass spectrometer is performed by: splitting the fraction into a first portion that is directed into the first stream of chromatographic eluate and a second portion that is directed into the second stream of chromatographic eluate; delivering the first portion of the fraction to the first mass spectrometer through a first fluid tubing line having a first length, $L_1$; and delivering the second portion of the fraction to the second mass spectrometer through a second fluid tubing line having a second length, $L_2$, wherein $L_2 > L_1$. According to some other embodiments, the delivery of the fraction to the first mass spectrometer and to the second mass spectrometer is performed by: splitting the fraction into a first portion that is directed into the first stream of chromatographic eluate and a second portion that is directed into the second stream of chromatographic eluate; delivering the first portion of the fraction to the first mass spectrometer through a first fluid tubing line comprising a bore having a first diameter, $D_1$; and delivering the second portion of the fraction to the second mass spectrometer through a second fluid tubing line comprising a bore having a second diameter, $D_2$, wherein $D_2 > D_1$. According to yet other embodiments, the delivery of the fraction to the first mass spectrometer and to the second mass spectrometer is performed by: generating the fraction by chromatographic fractionation of a first portion of a sample using a first chromatograph; separately, generating the fraction by chromatographic fractionation of a second portion of the sample using a second chromatograph; transporting the fraction generated by chromatographic fractionation of the first portion of the sample to the first mass spectrometer; and transporting the fraction generated by chromatographic fractionation of the second portion of the sample to the second mass spectrometer, wherein the generation of the fraction that is generated by chromatographic fractionation of the second portion of the sample is at a time that is later, by a time delay, $\Delta t_d$, than the generation of the fraction that is generated by chromatographic fractionation of the first portion of the sample.

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features of the present invention in greater detail, please refer to FIGS. 1, 2, 3A-3B, and 4A-4B in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise.

It should be noted that the terms "fluid tubing", "fluid tubing line", "fluid tubing segment" and similar terms as used herein are not intended to necessarily limit the embodiments to the use of tubing portions, in a strict sense, but are meant to include other alternative forms of fluid transfer lines or passageways such as, for example, channels or grooves in plates or bores in solid components. As used in this document the terms "chromatographic separation" and "chromatographic fractionation" are interchangeable. Both such terms refer to a process by which originally admixed compounds, dissolved in a chromatographic mobile phase, are caused to separate or at least partially separate, one from one another, upon differentially interacting with a stationary phase (or stationary phases) of one or more chromatographic columns. The differential interactions cause the various compounds to be retained within the column(s) for different respective lengths of time, termed "retention times". Accordingly, under continued flow of mobile phase through the column(s), with possibly variable mobile phase composition, the different compounds are generally caused to exit from a chromatograph outlet port at different respective times. In practice, each compound elutes within a certain restricted time range; during any such time range, it is possible that two or more compounds having similar retention times may co-elute. As used in this document, a chromatographic "fraction" is the complete assemblage of compounds that co-elute at any particular retention time. In any chromatographic separation experiment, the various retention times may be referenced to a single initial starting time point, which may correspond to a particular event or that may be arbitrarily defined.

As used in this document, the term "mass spectrometric analysis" refers to any and all operations undertaken by a mass spectrometer in order to generate mass spectral data, which comprises the identities of mass-to-charge ratio (m/z) values of ion species with an ionized sample and the relative quantities of the ion species having those m/z values. The term includes identifying the m/z values and relative quantities of ion species that are either: generated at an ion source of a mass spectrometer; generated by fragmentation of ions generated at an ion source; generated by fragmentation of other fragment ions; and generated by reaction of ions, either source-generated ions or fragment ions, with reagent ions. The term also includes ion manipulation steps that may be employed in preparing ions for measurements of m/z values and relative quantities. Such manipulation steps include isolating ions, fragmenting ions, storing ions, filtering ions, etc. In this document, the terms "scan", "mass scan" and "mass analyze", when used are verbs, are used interchangeably to denote the operation of a mass analyzer portion of a mass spectrometer in performing its general function of identifying and reporting the m/z values of ion species and the relative quantities of those ion species within any collection of ion species. The terms "scan", "mass scan" and "mass analysis", used are nouns, are used interchangeably to denote the results of such operation. In this document, the terms "scan" and "mass scan" are not intended to be limited to the operation of and data results produced by scanningtype mass analyzers; instead, these terms are intended to apply to the operation of and data produced by any type of mass analyzer.

Figure 3A:
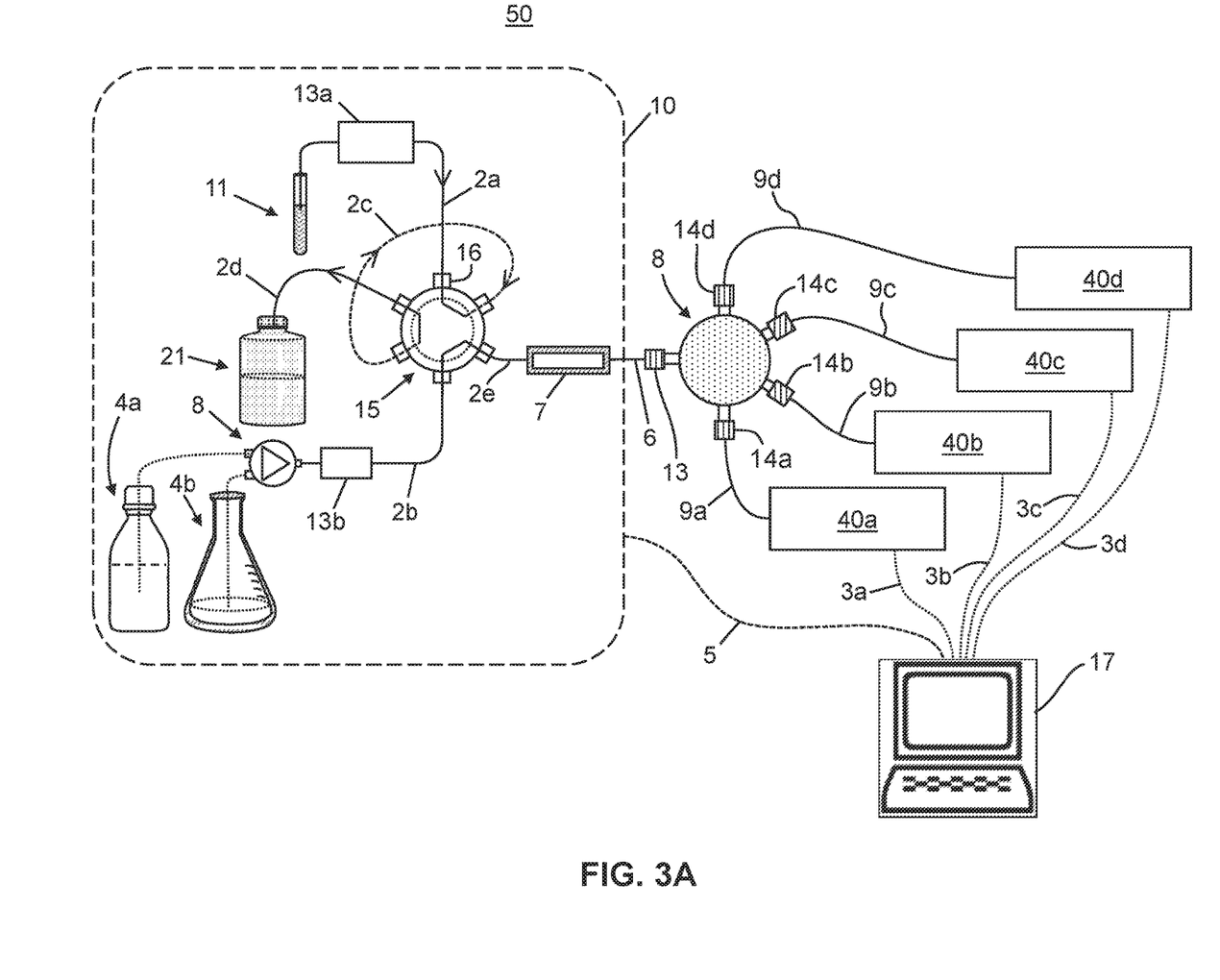
FIG. 3A is a schematic depiction of a first chromatographic and mass spectrometric analysis system in accordance with the present teachings.

FIG. 3A is a schematic depiction of a first chromatographic and mass spectrometric analysis system 50 in accordance with the present teachings. The chromatographic and mass spectrometric analysis system 50 comprises two or more mass spectrometers, depicted in the example of FIG. 3A by the four separate mass spectrometers 40a-40d. In practice, the total number of mass spectrometers included in the system 50 is not constrained to any particular value. Each mass spectrometer comprises a respective ion source, a respective fragmentation cell and a respective mass analyzer. However, the mass spectrometers need not be identical to one another; different mass spectrometers may be optimized for performing different tasks or different types of analyses. Each one of the mass spectrometers 40a-40d receives a sample stream that is a portion of a flux of eluate provided by a liquid chromatograph 10. The total flux of eluate that is discharged from the liquid chromatograph 10 is split into the sample stream portions by a distribution manifold or valve 8 that splits the flux among distribution fluid tubing lines 9a-9b that provide the portions to the various mass spectrometers. The manifold 8 comprises a single inlet port 13 that receives the total flux of eluate from the chromatograph and a plurality of outlet ports, here illustrated as the four outlet ports 14a-14d, that deliver the flux portions to the fluid tubing lines 9a-9b.

The distribution fluid tubing lines 9a-9b of the chromatographic and mass spectrometric analysis system 50 (FIG. 3A) comprise different dimensions such that each chromatographic fraction of the eluate is split into different portions that arrive at different mass spectrometers at different respective times. In the example of FIG. 3A, although all of the fluid tubing lines 9a-9b comprise the same bore diameter, fluid line 9a is shorter than fluid line 9b, fluid line 9b is shorter than fluid line 9c and fluid line 9c is shorter than fluid line 9d. Let the lengths of fluid tubing lines 9a, 9b, 9c and 9d be denoted as $L_1$, $L_2$, $L_3$, and $L_4$, respectively. Then, $L_4 > L_3 > L_2 > L_1$. Assuming that the total flux of eluate that arrives at the distribution manifold or valve 8 from transfer line 6 is substantially evenly distributed among the fluid tubing lines 9a-9b, then each chromatographic fraction portion will arrive first at mass spectrometer 40a, then at mass spectrometer 40b after a first time delay, then at mass spectrometer 40c after an additional time delay and, lastly at mass spectrometer 40d after a further additional time delay. As an alternative to configuring the fluid tubing lines 9a-9b with different lengths, it is possible to configure the fluid tubing lines with different bore diameters in order to achieve the same time-delay effects. As a further alternative, the distribution manifold or valve 8 could be configured so that the total flux is proportioned unevenly among the fluid tubing lines 9a-9b. Yet further alternatively, similar effects could be achieved through some combination of uneven flow splitting, different tubing lengths and different bore diameters.

The liquid chromatograph 10 provides a continuous stream of chromatographic eluate the flow of which is divided among the various mass spectrometers (e.g., mass spectrometers 40a-40d). A general depiction of a basic configuration of components of the chromatograph 10 is provided in FIG. 3A. The depiction in FIG. 3A is merely an example; in practice, the chromatograph may be configured in many alternative ways, such as with multiple columns, multiple valves, additional mobile phases, etc.

The illustrated exemplary chromatographic system 10 comprises an injection valve 15 such as, for example, a 6-port valve of a type commonly used in chromatographic systems. As shown in FIG. 3A, an injection port 16 of the valve 15 (and/or of the chromatograph 10) is fluidically coupled to a sample contained in a sample source 11 by means of fluid tubing line 2a. The sample may be delivered to the valve 15 under the impetus of a first fluid pump 13a. Another port of the valve (in this example, the fourth port) is fluidically coupled to two sources of mobile-phase solvents which, in this example, are the two solvents denoted as "Mobile Phase A" in solvent source 4a and "Mobile Phase B" in solvent source 4b. The solvents may be delivered to the valve port separately or in any mixed proportion through fluid tubing line 2b, the exact proportions being controlled by a gradient valve 8. Two ports of the injection valve 15 are fluidically coupled, respectively, to the two ends of a looped fluid tubing line 2c which may be used for temporary low-pressure storage of a portion of the sample. Switching of the valve 15 to an alternate valve configuration (not shown) enables the mobile phase(s) to mix with and flush the sample out of the looped fluid tubing line 2c at high pressure. Another port of the multiport valve 15 is fluidically coupled to a waste container 21 by means of fluid tubing line 2d and a final port of the valve (in this example, the third port) is fluidically coupled to outlet fluid tubing line 2e.

The outlet fluid tubing line 2e of the system 10 (FIG. 3A) delivers a sample portion (previously stored in looped fluid tubing line 2c) together with mobile phase solvent or solvents to a chromatographic separation column 7. As the sample and mobile phase(s) pass through the column, different chemical components of the sample are caused to separate (or at least to partially separate) from one another, thereby forming different chromatographic fractions, as a result of differential retention times within the column. A continuous stream of fluid eluate, which is mostly mobile phase, emerges from the column 7 into transfer line 6. The separated or partially separated sample fractions emerge as solutes within the mobile phase at different respective times. The composition of the mobile phase solvent may vary of the course of a chromatographic experiment, under the action of the gradient valve 8 which may vary the relative proportions of "Mobile Phase A" and "Mobile Phase B" that are delivered to the fluid tubing line 2b during the experiment.

A computer or other electronic controller 17 is in electronic communication with each of the mass spectrometers by means of electronic communication lines 3a-3d and with the chromatograph 10 by means of electronic communication line 5. The computer or electronic controller may comprise any combination of electronic logic components and circuitry, together with computer-readable instructions, either in software, firmware or some combination of both software and firmware. The computer-readable instructions are operable to at least receive acquired mass spectrometer data, delivered from communication line 3a, from a first mass spectrometer 40a and to provide operating instructions, along communication lines 3b-3c, to each of the other mass spectrometers 40b-40c. The specific instructions that are delivered to the other mass spectrometers are responsive to the received mass spectrometer data. Thus, the "first" mass spectrometer (that is, the mass spectrometer that provides the mass spectrometer data that is used in the determination of the subsequent instructions) is the mass spectrometer that first receives each sample fraction, such as by being coupled to the shortest distribution fluid tubing line 9a.

The computer or other electronic controller 17 may be a component of the first mass spectrometer 40a that performs the functions of formulating and transmitting operating instructions to the other mass spectrometers 40b-40c based on the data acquired by the first mass spectrometer. Alternatively, the computer or other electronic controller may be a centralized component or system, as illustrated in FIG. 3A, that receives data from all of the mass spectrometers and that transmits operating instructions either to all of the mass spectrometers or to all of the mass spectrometers other than the first mass spectrometer 40a. Each of the mass spectrometers that receives operating instructions may be configured with a respective receiving module, either in software or in firmware, that comprises computer-readable instructions operable to receive and/or decode the externally provided instructions and to adjust the mass spectrometer operation based on the received instructions.

Generally, data acquired by mass spectrometric analysis of chromatographic fractions is referenced to so-called retention times of the various fractions. The retention times are referenced to a particular time, $t_0$, of a known starting event, such as, for example, the particular time at which a sample is injected into the flow of mobile phase solvents. Retention times may be calibrated by reference to standard samples or internal standard materials having known or agreed-upon retention times under known conditions. To coordinate the mass spectrometer data acquisition with the chromatography, the computer or other electronic controller 17 is in communication with the chromatograph 10 by means of the electronic communication line 5. In some instances, the computer or other electronic controller 17 may transmit a "Start" command to the chromatograph that causes the chromatograph to initiate operation and that sets the reference time, $t_0$. Alternatively, the chromatograph may commence its operations under its own internal control in which case the chromatographs transmits a starting signal to the computer or other electronic controller. Similarly, the computer or other electronic controller 17 may either send commands or receive signals relating to other aspects of the chromatograph operation, such as a starting mobile phase composition, an ending mobile phase composition, a rate of change of mobile phase composition, etc.

In operation of the mass spectrometric analysis system 50, the first mass spectrometer repeatedly performs DIA mass spectrometric analyses of sample fractions as they are received from the chromatograph 10. The DIA analyses may be performed according to any of the SWATH MS technique, the $MS^2$ barcoding technique, the MSE analysis technique or any other DIA technique. The analyses include mass analyses of ions as received from an ion source ($MS^1$ scans) as well as of fragment ions ($MS^1$ scans). These analyses are performed continuously over the course of a chromatographic separation, since the composition of the fractions continuously changes. As they analyses proceed, the mass spectral results of the analysis are reported to the computer or other electronic controller 17. At a minimum, the computer analyzes the $MS^1$ scans to determine if, among the various reported m/z values, any of these correspond to a compound that has not been previously reported. An m/z value may correspond to a compound that has not been previously reported if it is not tabulated, together with the retention time at which is was observed, in any known database of mass spectrometric data of compounds. Thus, after each $MS^1$ scan acquired by the first mass spectrometer 40a, the computer or other electronic controller 17 compares the observed m/z values to those in known databases, including a local database.

If an observed m/z value, together with its corresponding retention time, is not recognized in any of the databases and the observed intensity that corresponds to the m/z value is greater than or equal to a pre-determined threshold intensity, then the computer or other electronic controller 17 transmits information and instructions to the second mass spectrometer 40b to enable it to prepare for and perform additional mass spectral analysis of the ion species corresponding to that m/z value. The information that is sent to the second mass spectrometer includes at least the identified m/z value and the corresponding retention time and may include additional information or instructions pertaining to what type of analysis the second mass analyzer is required to perform and/or how it is to perform it. At minimum, the additional mass spectral analysis includes isolating ions having the identified m/z value in the second mass spectrometer, fragmenting the isolated ions in a fragmentation cell of the second mass spectrometer and mass analyzing the so-generated fragment ions using a mass analyzer of the second mass spectrometer 40b, thereby performing an $MS^2$ analysis. In some instances (for example, when studying certain classes of molecules), the additional mass spectral analysis performed by the second mass spectrometer 40b may further include isolating some of the fragment ions (for example, those in greatest abundance), fragmenting the isolated fragment ions and mass analyzing the fragments of the fragment ions, thereby performing an $MS^3$ analysis. More generally, the additional mass spectral analysis performed by the second mass spectrometer 40b may comprise performing an $MS^N$ analysis (N=1, 2, 3, ... ).

The arrival of each chromatographic fraction at the second mass spectrometer 40b is delayed relative to its arrival at the first mass spectrometer 40a. Provided that the difference in fluid tubing lengths, $L_2-L_1$, is sufficient, there will be sufficient time for the data analysis, database search, instruction transmittal, and preparation of the second mass spectrometer prior to the arrival, at the second mass spectrometer, of the compound corresponding to the identified m/z. Meanwhile, the first mass spectrometer 40a continues repeating its task of performing data-independent analyses of compounds that elute at progressively later retention times.

At the completion of the additional mass spectral analysis by the second mass spectrometer 40b, mass spectral data from that analysis is stored in a new entry in the local database. The stored data includes at least the observed $MS^1$ m/z value and retention time, a list of the observed mass spectral peaks in the $MS^2$ scan as well as other pertinent information relating to sample identification and experimental run conditions. Once the database entry is created, it becomes part of the search library that is consulted by the computer or other electronic controller 17 during future experimental runs.

Upon recognition of the occurrence of ion species having an m/z value that does not correspond to an entry in a known database and that has a corresponding observed intensity that is greater than or equal to a pre-determined threshold intensity, the computer or other electronic controller 17 may also add that m/z to an exclusion list that is stored in computer memory. An exclusion list is a list of m/z values of which the corresponding ions are to be temporarily excluded from further additional mass spectroscopic analysis by the second and subsequent mass spectrometers (in the example, mass spectrometers 40b-40d). The exclusion list is maintained to prevent un-necessary duplicative work because, once the ion species that corresponds to the recognized m/z has been subjected to the additional mass spectrometric analysis a sufficient number of times (for instance, to achieve a statistical confidence level), there is no need for further additional mass spectrometric analysis of that ion species. The amount of time that an m/z value remains on the exclusion list generally corresponds to the width, in time, of the chromatographic peaks of individual eluting compounds, given the particular experimental conditions. After an appropriate time has passed, the m/z value is removed from the exclusion list by the computer or other electronic controller 17. Alternatively, the m/z value may remain on the exclusion list until the computer or other electronic controller 17 recognizes, during its repeated $MS^1$ scans, that that the observed intensity (ion abundance) at that m/z value has fallen below a threshold value. If the same m/z is subsequently observed in an acquired mass spectrum at a different retention time, then it is treated as a new compound and submitted for additional mass spectrometric analysis as described above.

If the number of additional mass spectrometric analyses that are directed to the second mass spectrometer 40b is predicted to exceed the number of analyses that it may complete within a certain time increment, such as the peak width of a typical chromatographic peak, then any additional analyses may be directed to a third mass spectrometer 40c. Likewise, if the workload assigned to the third mass spectrometer becomes too great, additional analyses may be directed to a fourth mass spectrometer, 40d, and so on. However, if the system 50 is employed in this fashion, then there is a possibility of over-broadening of peaks (in time) of ion species the additional analyses of which are directed to the later-receiving mass spectrometers (e.g., mass spectrometers 40c and 40d). Such peak broadening may result from the additional chromatographic "dead volume" that may result from the extra lengths of the fluidic tubing lines 40c and 40d. Re-mixing of different chromatographic fractions within the additional dead volume may cause the broadened chromatographic peaks to lose peak intensity, thereby requiring additional mass scans in order to generate statistically significant data.

Figure 3B:
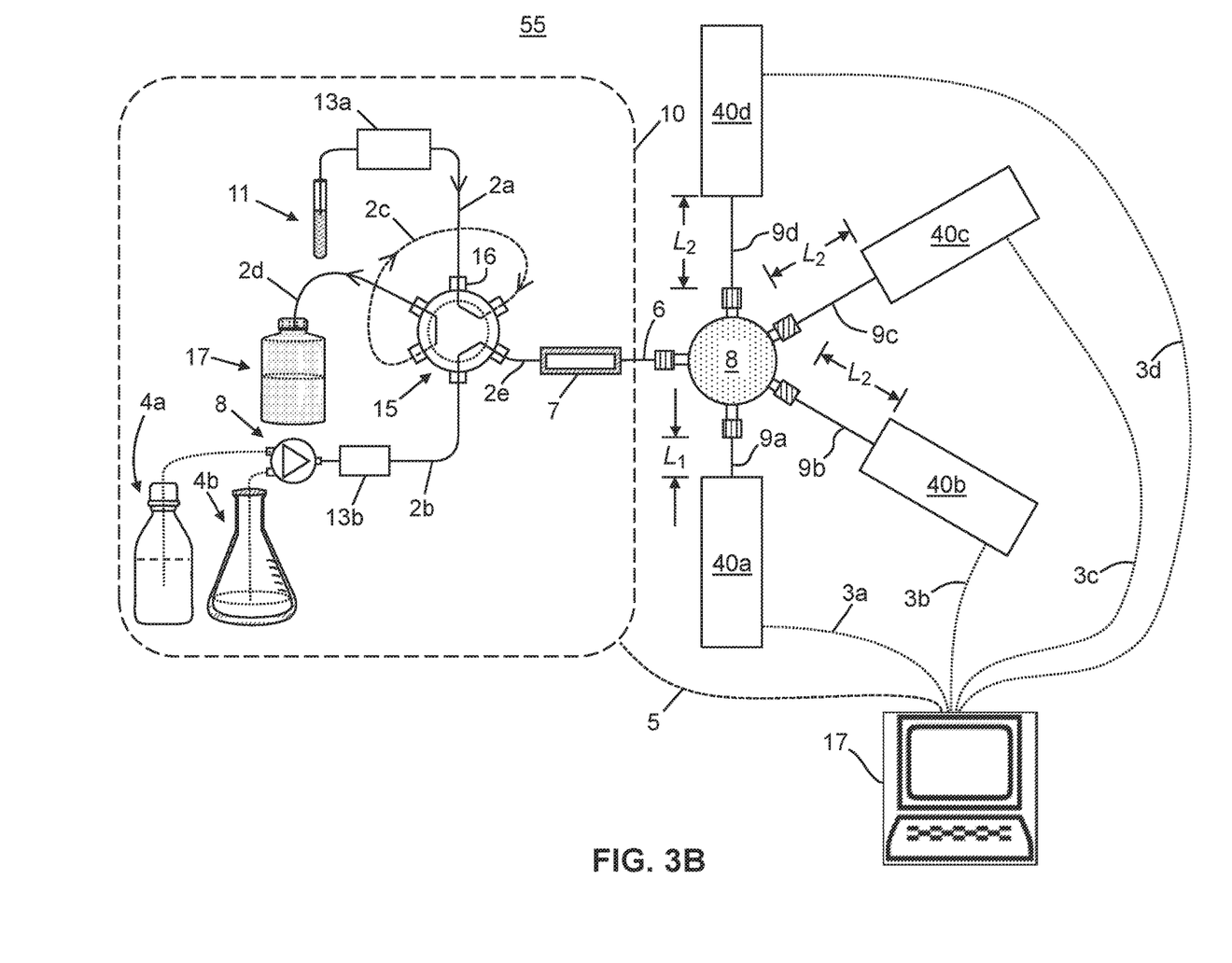
FIG. 3B is a schematic depiction of a variant configuration of the chromatographic and mass spectrometric analysis system of FIG. 3A.

To overcome the potential peak broadening phenomenon noted above, the chromatographic and mass spectrometric analysis system may be modified to a configuration such as is provided by the system 55 that is depicted in FIG. 3B. It should be noted that the illustrated apparent geometric configuration of mass spectrometers and the representation of fluid tubing lines by straight tubing segments, as depicted in FIG. 3B is schematic and for illustrative purposes only. The system 55 (FIG. 3B) comprises only two fluid tubing line lengths. Whereas the length of the fluid tubing line 9a that couples the manifold 8 to the first mass spectrometer has length $L_1$, all of the other fluid tubing lines 9b-9d have substantially the same length $L_2$, where $L_2 > L_1$. The operation of the system 55 (FIG. 3B) is similar to the operation of the system 50 described above. If $MS^1$ scans acquired by the first mass spectrometer 40a identify an m/z value that suggests that the corresponding an ion species should be subjected to additional mass spectrometric analysis, then such additional analysis is assigned to the second mass spectrometer 40b. Such assignments continue until the workload assigned to the second mass spectrometer 40b reaches its operating capacity. Further additional mass spectroscopic analyses are then assigned to the third mass spectrometer until its operating capacity is met. At such time, the second mass spectrometer 40b may have completed some or all of its assigned analyses. If so, then any yet further assigned analyses are directed, once again, to the second mass spectrometer. Otherwise, the yet further analyses are directed to the fourth mass spectrometer 40c. The computer or electronic controller 17 manages the workloads of the various mass spectrometers.

Figure 4A:
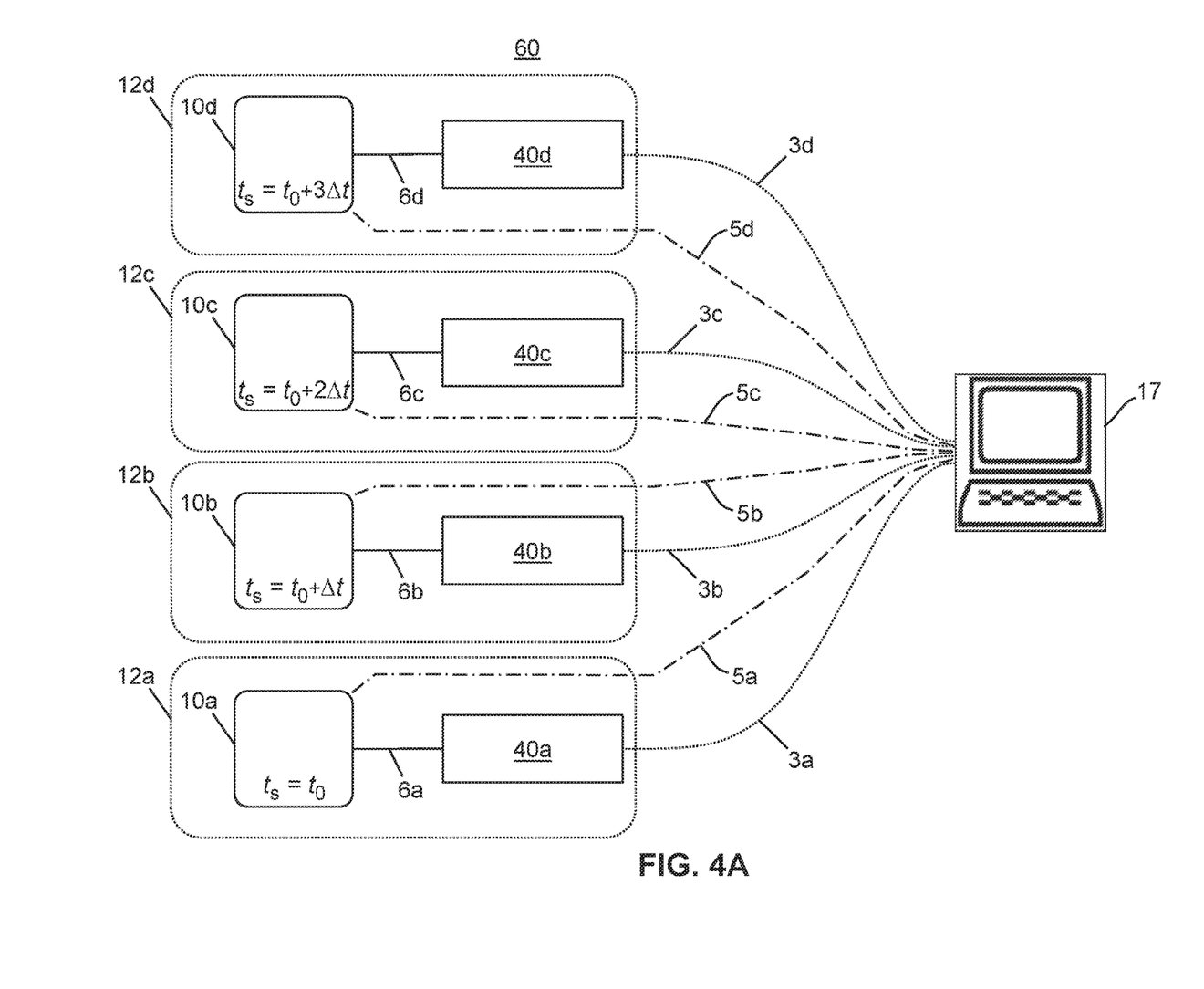
FIG. 4A is a schematic depiction of a first chromatographic and mass spectrometric analysis system in accordance with the present teachings.

FIG. 4A is a schematic depiction of another chromatographic and mass spectrometric analysis system 60 in accordance with the present teachings. In similarity to the chromatographic and mass spectrometric analysis system 50 (FIG. 3A), the system 60 (FIG. 4A) comprises two or more mass spectrometers, which are illustrated in FIG. 4A as the four mass spectrometers 40a-40d. In practice, the total number of mass spectrometers included in the system 60 is not constrained to any particular value. The system 60 differs from the system 50 in that each mass spectrometer receives eluate from a respective chromatograph to which it is fluidically coupled by a respective fluid tubing line. For instance, as depicted in FIG. 4A, the mass spectrometers 40a, 40b, 40c and 40d are fluidically coupled to separate chromatographs 10a, 10b, 10c and 10d, respectively, by fluid tubing transfer lines 6a, 6b, 6c and 6d, respectively.

For simplicity, the internal components of chromatographs 10a-10d are not illustrated in FIG. 4A. The internal chromatograph components may be configured as shown in FIG. 3A or, alternatively, may be configured according to any alternative configuration. However, it is preferable that chromatographs 10a, 10b, 10c and 10d are constructed and configured identically to one another. The mass spectrometers need not be identical to one another.

Optionally, each mass spectrometer may be provided within a same housing as is the chromatograph to which it is fluidically coupled. For example, both mass spectrometer 40a and chromatograph 10a are illustrated as being housed within housing 12a in FIG. 4A. Likewise, according to the example in FIG. 4A, housing 12b houses both mass spectrometer 40b and chromatograph 10b; housing 12c houses both mass spectrometer 40c and chromatograph 10c; and housing 12d houses mass both spectrometer 40d and chromatograph 10d.

A computer or other electronic controller 17 is in electronic communication with each mass spectrometer and each chromatograph. In the example depicted in FIG. 4A, electronic communication lines 3a-3d facilitate communications between the mass spectrometers and the computer or other electronic controller 17 and electronic communication lines 5a-5d facilitate communications between the mass spectrometers and the computer or other electronic controller 17. If mass spectrometers and chromatographs are paired in common housings, as shown in FIG. 4A, then each such pair may be an encapsulated system that includes its own respective dedicated controller module or modules, implemented in either software or firmware, for coordinating the operations of the commonly housed mass spectrometer and chromatograph. In such cases, only one communication line may be required between the computer or other electronic controller 17 and each such encapsulated system, in place of separate communication lines connected to the mass spectrometer and the chromatograph.

In operation of the chromatographic and mass spectrometric analysis system 60 depicted in FIG. 4A, all of the chromatographs 10a-10d are configured to effect a chromatographic separation of a respective portion of a same sample. Thus, a first step in performing a chromatographic experiment in accordance with the present teachings is to divide a sample into separate portions and to provide each sample portion to a respective one of the chromatographs 10a-10d. The chromatographs are configured, in operation, to perform identical chromatographic separation procedures (e.g., with identical mobile phases, compositional gradients, applied temperatures, etc.). Thus, each sample portion is fractionated identically and each mass spectrometer receives the same set of sample fractions. Preferably, the only differences between the operation of the various chromatographs are different chromatographic start times, $t_s$. For example, if the start time of chromatograph 10a is at $t_0$, then the start times of the other chromatographs may be staggered, as illustrated in FIG. 4A, with the start times of chromatographs 10b, 10c and 10d being set at ($t_0+\Delta t$), ($t_0+2\Delta t$), and ($t_0+\Delta t$), respectively, where $\Delta t$ is a constant time increment.

As a result of the different start times, a "first" mass spectrometer 40a receives each chromatographically separated sample fraction in advance of the receipt of the same fraction by the other mass spectrometers. The other mass spectrometers 10b, 10c and 10d receive the same fraction at progressively later times. Accordingly, the operation of the system 60 shown in FIG. 4A is similar to the operation of the system 50 shown in FIG. 3A, with the only difference being that each sample fraction analyzed by a given combination of chromatograph and mass spectrometer of the system 60 is derived from its respective sample portion, instead of from a common sample, as in the system 50.

Figure 4B:
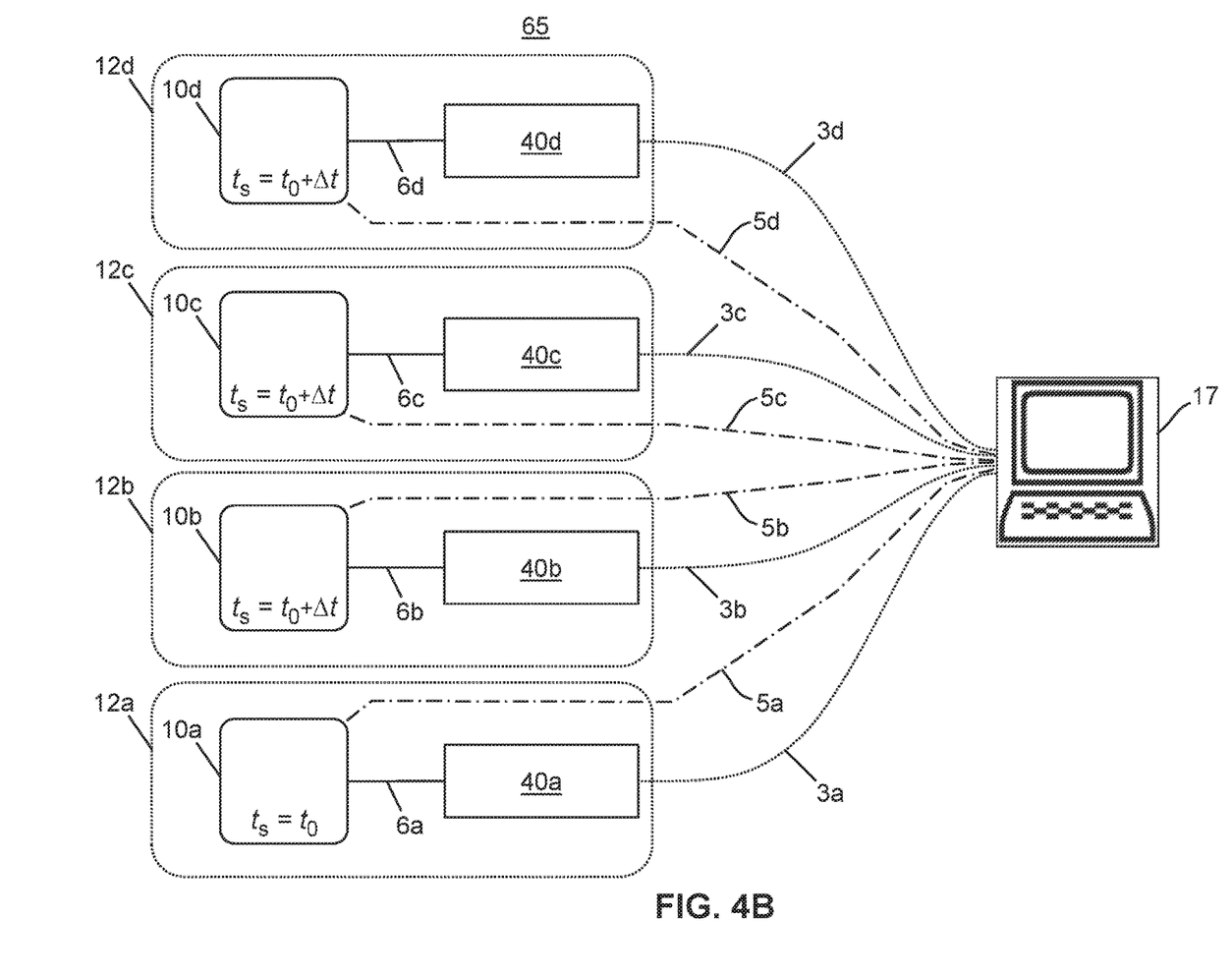
FIG. 4B is a schematic depiction of a variant configuration of the chromatographic and mass spectrometric analysis system of FIG. 4A.

An advantage of the system 60, relative to the system 50, is that each one of the connecting fluid tubing lines 6a-6d may be provided at a common minimum length, thereby avoiding possible peak broadening associated with longer tubing lengths. Another advantage of the system 60, relative to the system 50, is that that the differences between the starting times, $t_s$, of the different chromatographic fractionations may be independently set prior to each experiment, because the starting times of each chromatograph may be set by respective "trigger" signals (or commands) sent by the computer or other electronic controller 17. For example, FIG. 4B illustrates a variant configuration, depicted generally at 65, in which the start times for the chromatographs 10b-10d are all set at the common time point of ($t_0+\Delta t$). Thus, the operation of the system 65 illustrated in FIG. 4B emulates the operation of the system 55 illustrated in FIG. 3B.

Methods and apparatus for improved data-independent mass spectral analysis and documentation of the occurrence of previously non-documented compounds (so-called "dark matter") have been herein disclosed. The discussion included in this application is intended to serve as a basic description. The present invention is not intended to be limited in scope by the specific embodiments described herein, which are intended as single illustrations of individual aspects of the invention. Instead, the invention is limited only by the claims. Various other modifications of the invention, in addition to those shown and described herein will become apparent to those skilled in the art from the foregoing description and accompanying drawings. All such variations and functionally equivalent methods and components are considered to be within the scope of the invention. Any patents, patent applications, patent application publications or other literature mentioned herein are hereby incorporated by reference herein in their respective entirety as if fully set forth herein, except that, in the event of any conflict between the incorporated reference and the present specification, the language of the present specification will control.

What is claimed is:

1. A liquid chromatographic and mass spectrometric analysis system for analyzing a sample comprising:
   first and second mass spectrometers;
   at least one liquid chromatograph configured to simultaneously supply a first stream of chromatographic eluate derived from the sample to the first mass spectrometer and a second stream of chromatographic eluate derived from the sample to the second mass spectrometer; and
   a computer or electronic controller electronically coupled to both of the first and second mass spectrometers, the computer or electronic controller comprising computer-readable instructions operable to:
      input a mass spectrometric analysis of a chromatographic fraction of the sample obtained by the first mass spectrometer;
      formulate a determination whether an additional mass spectrometric analysis of the chromatographic fraction of the sample is required, based on the mass spectrometric analysis of the chromatographic fraction of the sample obtained by the first mass spectrometer; and
      if the determination is affirmative, cause the second mass spectrometer to perform, after a time delay, $\Delta t_d$, the additional mass spectrometric analysis of the chromatographic fraction of the sample.

2. A liquid chromatographic and mass spectrometric analysis system as recited in claim 1, wherein the at least one liquid chromatograph comprises a single liquid chromatograph, the system further comprising:
   a manifold comprising:
      an inlet port fluidically coupled to an outlet of the single liquid chromatograph; and
      first and second outlet ports;
   a first fluid tubing line having a length, $L_1$, and fluidically coupled between the first outlet port and an ion source of the first mass spectrometer, the first fluid tubing line transporting the first stream of chromatographic eluate; and
   a second fluid tubing line having a length, $L_2$, and fluidically coupled between the second outlet port and an ion source of the second mass spectrometer, the second fluid tubing line transporting the second stream of chromatographic eluate,
   wherein $L_2 > L_1$.

3. A liquid chromatographic and mass spectrometric analysis system as recited in claim 1, wherein the at least one liquid chromatograph comprises a single liquid chromatograph, the system further comprising:
   a manifold comprising:
      an inlet port fluidically coupled to an outlet of the single liquid chromatograph; and
      first and second outlet ports;
   a first fluid tubing line comprising an internal bore having a diameter, $D_1$, and fluidically coupled between the first outlet port and an ion source of the first mass spectrometer, the first fluid tubing line transporting the first stream of chromatographic eluate; and
   a second fluid tubing line comprising an internal bore having a diameter, $D_2$, and fluidically coupled between the second outlet port and an ion source of the second mass spectrometer, the second fluid tubing line transporting the second stream of chromatographic eluate,
   wherein $D_2 > D_1$.

4. A liquid chromatographic and mass spectrometric analysis system as recited in claim 1, wherein the at least one liquid chromatograph comprises a first liquid chromatograph and a second liquid chromatograph, the system further comprising:
   a first portion of the sample fluidically coupled to an injection port of the first liquid chromatograph;

a second portion of the sample fluidically coupled to an injection port of the second liquid chromatograph;

a first fluid tubing line fluidically coupled between the first liquid chromatograph and an ion source of the first mass spectrometer, the first fluid tubing line transporting the first stream of chromatographic eluate; and a second fluid tubing line fluidically coupled between the second liquid chromatograph and an ion source of the second mass spectrometer, the second fluid tubing line transporting the second stream of chromatographic eluate, wherein the computer-readable instructions are further operable to cause the first liquid chromatograph to start chromatographic separation of the first portion of the sample at a time, $t_1$, and to cause the second liquid chromatograph to start chromatographic separation of the second portion of the sample at a time, $t_2$, where $(t_2-t_1)=\Delta t_d$.

5. A liquid chromatographic and mass spectrometric analysis system as recited in claim 1, wherein the computer-readable instructions are further operable to, if the determination is affirmative, cause the second mass spectrometer to perform the additional mass spectrometric analysis on ions either having or derived from precursor ions having either a particular mass-to-charge ratio (m/z) or a particular range of m/z values.

6. A liquid chromatographic and mass spectrometric analysis system as recited in claim 1, wherein the computer-readable instructions are further operable to, if the determination is affirmative, add ions of a particular m/z value or a particular range of m/z values to an exclusion list.

7. A liquid chromatographic and mass spectrometric analysis system as recited in claim 1, wherein the computer-readable instructions are further operable to, if the determination is not affirmative, remove ions of a particular m/z value or a particular range of m/z values from an exclusion list.

8. A liquid chromatographic and mass spectrometric analysis system as recited in claim 1, wherein the computer-readable instructions that are operable to formulate the determination whether an additional mass spectrometric analysis of the chromatographic fraction of the sample is required are operable to formulate an affirmative determination if the mass spectrometric analysis of the chromatographic fraction of the sample obtained by the first mass spectrometer detects an ion having an m/z value that is absent from a mass spectral library and having a corresponding observed intensity that is greater than or equal to a pre-determined threshold intensity.

9. A liquid chromatography mass spectrometry method comprising:

performing, with a first mass spectrometer, mass spectrometric analyses of ions generated from chromatographically separated fractions of a sample within a first stream of chromatographic eluate derived from the sample; and upon detection of a predetermined condition or event relating to mass spectral data acquired by the first mass spectrometer of a fraction having a retention time, $\tau_1$, automatically issuing a command to a second mass spectrometer to perform a mass spectrometric analysis of the ion species within the same fraction within a second stream of chromatographic eluate derived from the sample, wherein the fraction is delivered to the second mass spectrometer at a time that is later, by a time delay, $\Delta t_d$, than a time at which the fraction is delivered to the first mass spectrometer.

10. A liquid chromatography mass spectrometry method as recited in claim 9, wherein the predetermined condition or event is the detection, during the mass spectrometric analyses performed by the first mass spectrometer, of an ion species within a fraction having a mass-to-charge ratio (m/z) value for which there is no entry in a database and having a corresponding observed intensity that is greater than or equal to a pre-determined threshold intensity.

11. A liquid chromatography mass spectrometry method as recited in claim 9 further comprising, upon detection of the predetermined condition or event, adding an m/z value of an ion species to an exclusion list.

12. A liquid chromatography mass spectrometry method as recited in claim 9, wherein the mass spectrometric analysis, by the second mass spectrometer, of the ion species within the fraction having the retention time, $\tau_1$, is performed simultaneously with mass spectrometric analyses, by the first mass spectrometer, of ion species within a second fraction having a later retention time, $\tau_2$.

13. A liquid chromatography mass spectrometry method as recited in claim 9, wherein the delivery of the fraction to the first mass spectrometer and to the second mass spectrometer is performed by:

splitting the fraction into a first portion that is directed into the first stream of chromatographic eluate and a second portion that is directed into the second stream of chromatographic eluate;

delivering the first portion of the fraction to the first mass spectrometer through a first fluid tubing line having a first length, $L_1$; and delivering the second portion of the fraction to the second mass spectrometer through a second fluid tubing line having a second length, $L_2$, wherein $L_2>L_1$.

14. A liquid chromatography mass spectrometry method as recited in claim 9, wherein the delivery of the fraction to the first mass spectrometer and to the second mass spectrometer is performed by:

splitting the fraction into a first portion that is directed into the first stream of chromatographic eluate and a second portion that is directed into the second stream of chromatographic eluate;

delivering the first portion of the fraction to the first mass spectrometer through a first fluid tubing line comprising a bore having a first diameter, $D_1$; and delivering the second portion of the fraction to the second mass spectrometer through a second fluid tubing line comprising a bore having a second diameter, $D_2$, wherein $D_2>D_1$.

15. A liquid chromatography mass spectrometry method as recited in claim 9, wherein the delivery of the fraction to the first mass spectrometer and to the second mass spectrometer is performed by:

generating the fraction by chromatographic fractionation of a first portion of a sample using a first chromatograph;

separately, generating the fraction by chromatographic fractionation of a second portion of the sample using a second chromatograph;

transporting the fraction generated by chromatographic fractionation of the first portion of the sample to the first mass spectrometer; and transporting the fraction generated by chromatographic fractionation of the second portion of the sample to the second mass spectrometer, wherein the generation of the fraction that is generated by chromatographic fractionation of the second portion of the sample is at a time that is later, by a time delay, $\Delta t_d$, than the generation of the fraction that is generated by chromatographic fractionation of the first portion of the sample.

16. A liquid chromatography mass spectrometry method as recited in claim 9, further comprising, upon detection of the predetermined condition or event, automatically issuing a command to a third mass spectrometer to perform a mass spectrometric analysis of the ion species within the same fraction within a third stream of chromatographic eluate derived from the sample, wherein the fraction is delivered to the third mass spectrometer at a time that is later, by a second time delay, $\Delta t_{d2}$, than the time at which the fraction is delivered to the first mass spectrometer, wherein the third mass spectrometer is configured to perform mass analyses using a fragmentation method that differs from a fragmentation method that is used by the second mass spectrometer.

17. A liquid chromatography mass spectrometry method as recited in claim 9, further comprising, upon detection of a second predetermined condition or event relating to mass spectral data acquired by the first mass spectrometer of a second fraction having a second retention time, $\tau_2$, automatically issuing a command to a third mass spectrometer to perform a mass spectrometric analysis of the ion species within the second fraction within a third stream of chromatographic eluate derived from the sample, wherein the second fraction is delivered to the third mass spectrometer at a time that is later, by a second time delay, $\Delta t_{d2}$, than the time at which the second fraction is delivered to the first mass spectrometer, wherein the third mass spectrometer is configured to perform mass analyses using a fragmentation method that differs from a fragmentation method that is used by the second mass spectrometer.

* * * * *